(12) United States Patent
Wijaya et al.

(10) Patent No.: US 8,442,752 B2
(45) Date of Patent: May 14, 2013

(54) CLIMATE CONTROL HEAD WITH FUEL ECONOMY INDICATOR

(75) Inventors: Halim Wijaya, Canton, MI (US); Gerhard A. Dage, Franklin, MI (US); Wayne Frank Buescher, Canton, MI (US); Christopher Mark Greiner, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 825 days.

(21) Appl. No.: 12/428,749

(22) Filed: Apr. 23, 2009

(65) Prior Publication Data

US 2010/0274394 A1    Oct. 28, 2010

(51) Int. Cl.
*G05B 15/00* (2006.01)
*B60K 6/20* (2007.10)

(52) U.S. Cl.
USPC ............................................. 701/123; 701/99

(58) Field of Classification Search ............ 701/36, 701/99, 123; 340/500–503, 517, 519, 521–525, 340/539.26, 449, 439, 870.17; 700/276–279; 180/65.275
See application file for complete search history.

(56) References Cited

U.S. PATENT DOCUMENTS

| 4,369,634 | A | | 1/1983 | Ratto |
| 5,228,305 | A | | 7/1993 | Vogt |
| 5,534,759 | A | | 7/1996 | Evans et al. |
| 5,700,191 | A | | 12/1997 | Nieling et al. |
| 5,983,146 | A | * | 11/1999 | Sarbach ........................ 701/36 |
| 6,078,853 | A | | 6/2000 | Ebner et al. |
| 6,155,341 | A | * | 12/2000 | Thompson et al. ........... 165/244 |
| 6,698,663 | B2 | * | 3/2004 | Wang et al. .................. 236/49.3 |
| 6,823,685 | B2 | * | 11/2004 | Fruhauf et al. .................. 62/178 |
| 6,859,687 | B2 | * | 2/2005 | Obradovich et al. ............. 701/1 |
| 6,925,369 | B2 | | 8/2005 | Obayashi |
| 7,490,000 | B2 | * | 2/2009 | Siddiqui et al. ............... 701/104 |
| 7,861,547 | B2 | * | 1/2011 | Major et al. .................. 62/228.1 |
| 7,949,615 | B2 | * | 5/2011 | Ehlers et al. .................. 705/412 |
| 8,009,028 | B2 | * | 8/2011 | Uesaka et al. .............. 340/450.2 |
| 2003/0146290 | A1 | * | 8/2003 | Wang et al. .................. 236/49.3 |
| 2008/0059035 | A1 | * | 3/2008 | Siddiqui et al. ................ 701/93 |
| 2008/0099570 | A1 | * | 5/2008 | Krebs et al. ................. 236/46 R |
| 2009/0031741 | A1 | * | 2/2009 | Hara et al. ...................... 62/239 |
| 2009/0234528 | A1 | * | 9/2009 | Crombez ........................ 701/29 |
| 2009/0293521 | A1 | * | 12/2009 | Major et al. .................. 62/228.1 |
| 2010/0073158 | A1 | * | 3/2010 | Uesaka et al. .............. 340/450.2 |
| 2011/0095878 | A1 | * | 4/2011 | Skaff et al. .................... 340/441 |

* cited by examiner

*Primary Examiner* — Khoi Tran
*Assistant Examiner* — Jason Holloway
(74) *Attorney, Agent, or Firm* — David B. Kelley; Brooks Kushman P.C.

(57) ABSTRACT

A climate control system having a control head including a display providing at least one comfort level indicator and a fuel economy indicator is provided. The comfort level indicator displays a plurality of comfort level settings corresponding to relative thermal comfort in all weather conditions. Each comfort level setting corresponds to a range of temperatures so that once a comfort range is obtained, the climate control system will be reluctant to consume additional energy, thereby maintaining or improving the current fuel economy state. The fuel economy indicator provides for direct communication of the impact of comfort level settings on fuel economy.

15 Claims, 3 Drawing Sheets

CLIMATE CONTROL HEAD WITH FUEL ECONOMY INDICATOR

BACKGROUND

1. Technical Field

The present invention relates to a climate control head design having a fuel economy display, and more particularly a climate control head having fuel economy indicators corresponding to vehicle occupant comfort level settings.

2. Background Art

Automatic climate control is increasingly prevalent in vehicles today. In some vehicles, a driver merely chooses a temperature setting through a climate control head unit, and a control system operates a climate control system to achieve the desired temperature. The climate control system may control the functions of a fan—e.g., on/off and fan speed—and an air conditioning (A/C) system. Such a climate control system may also control the position and movement of various air dampers, or air flow doors, to control movement of air through an evaporator core or a heater core, the recirculation of air through the vehicle, the intake of fresh air, or some combination thereof.

Conventional automatic temperature control head design allows users to set extreme temperature set points often resulting in significant fuel economy penalties. For example, an occupant may set the automatic temperature control at the extreme low setting in warm ambient conditions while simultaneously opening vehicle windows. In doing so, the air conditioning system uses an air conditioning compressor and a condenser to effectuate cooling of a passenger cabin of the vehicle. However, operation of the air conditioning compressor uses a relatively large amount of energy. Meanwhile, some of the cooling capacities of the A/C system are lost when the windows are open.

The lower the automatic temperature setting, the harder the compressor and a heating, venting and air conditioning (HVAC) blower must work to attain the extreme setting. In the case of a hybrid electric vehicle (HEV), operation of an electric compressor often necessitates starting the engine to ensure that the battery is not over-discharged. One of the benefits of an HEV is the fuel savings achieved by driving the vehicle using electric motor power, while maximizing the time the engine is shut down. Thus, inefficient operation of the climate control system can offset some of the benefits gained by driving an HEV. The impact this has on fuel economy is not directly communicated to the driver.

Accordingly, a need exists for a system and method for vehicle climate control that strikes a balance between meeting the comfort requirements of vehicle occupants and minimizing the overall power consumed by the climate control system. Further, there exists a need to provide vehicle occupants with a climate control head that works with the climate control system to minimize inefficient operation of the climate control system while providing direct fuel economy feedback.

DETAILED DESCRIPTION

Figure 1:
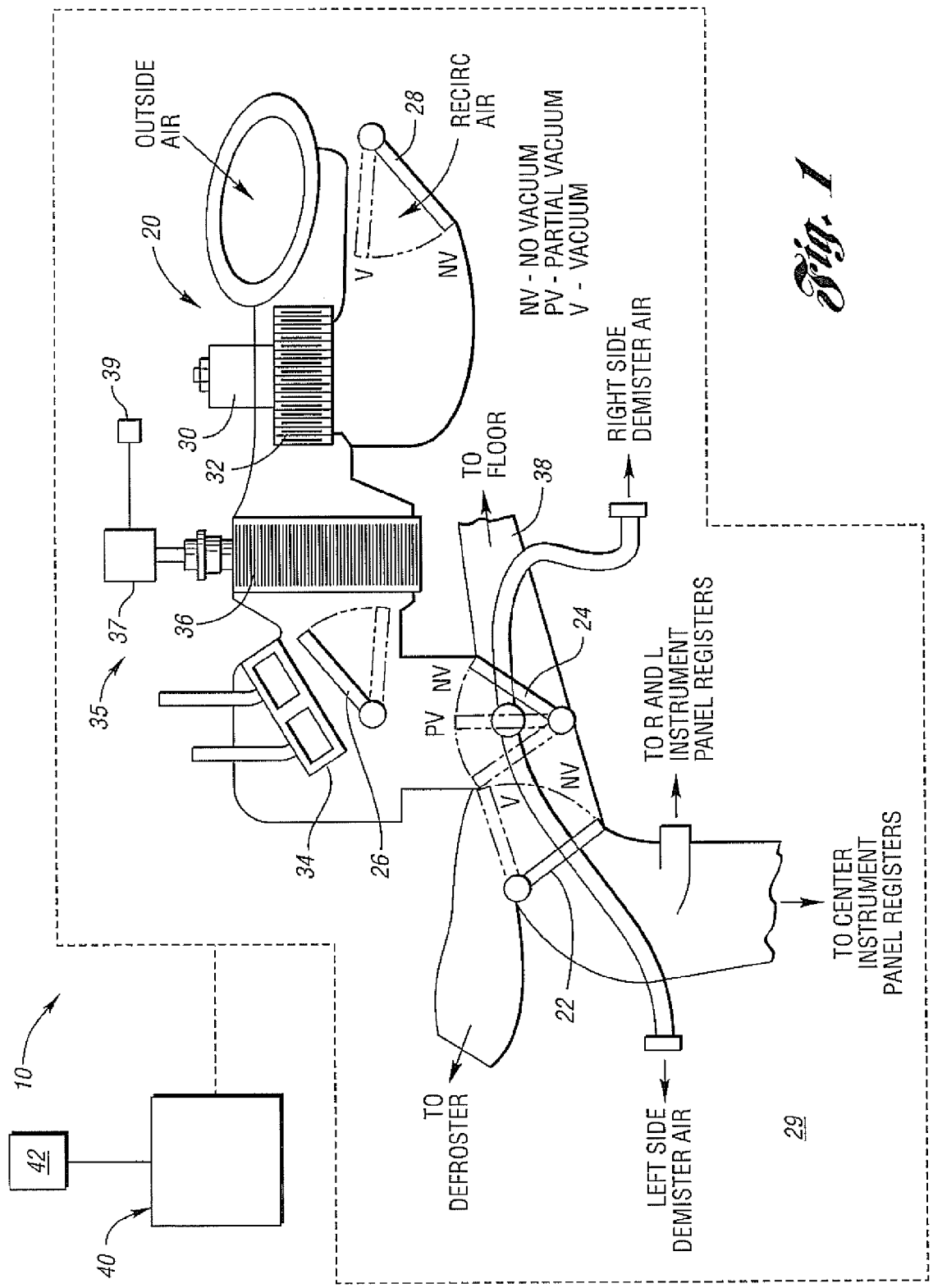
FIG. 1 is a simplified, exemplary schematic diagram illustrating a system for environmental management of a vehicle in accordance with an embodiment of the present application.

In general, control of cabin temperature, as well as temperature and defogging of a windshield, within an automobile is accomplished using various actuators to adjust the temperature and flow of air supplied to the cabin of the vehicle. FIG. 1 schematically shows an exemplary climate control system 10 for environmental management of a vehicle in accordance with an embodiment of the present application. The vehicle may include a heating, ventilating and air conditioning (HVAC) system, generally indicated at 20. The HVAC system 20 can include the arrangement of airflow doors, including panel-defrost, floor-panel, and outside recirculated air actuators or doors 22, 24, and 28, respectively.

The doors may be part of an air distribution system for directing the flow of conditioned air to various locations within a passenger cabin 29 of the vehicle, such as to the windshield, floor, or instrument panel as is commonly known. The doors 22, 24 and 28 may be driven by vacuum motors (not shown) between their various vacuum, partial vacuum and no vacuum positions in a conventional fashion as indicated in FIG. 1, or may be driven by an electric servo motor. A temperature control blend door 26 may also provided, and may be driven by an electric servo motor (not shown). The temperature control blend door 26 provides for hot air mixing done to obtain a desired target discharge air temperature, which reflects the temperature of air as it exits the HVAC system 20 into the passenger cabin 29.

The HVAC system 20 may also include a variable speed fan system (also referred to herein as an HVAC blower) 30 including a blower wheel 32 for generating airflow. The HVAC system 20 may further include a heating system, shown in FIG. 1 as a heater core 34, and an air conditioning (A/C) system 35, including an evaporator core 36 and a compressor 37. The compressor 37 may be an electric compressor rather than one that is mechanically driven by an engine. This can provide greater control of the operation of the HVAC system 20, in that electric compressors can be configured for variable speed operation, unlike their mechanical counterparts whose speed is inextricably linked with the speed of the engine. The air conditioning system 35 may include other various components known to one of ordinary skill in the art.

The heater core 34 and the evaporator core 36 respectively heat and cool the airflow generated by the fan system 30. The generated airflow may be distributed through an airflow distribution system and associated ducting 38. The HVAC system 20 may control the temperature, the direction of the airflow, and the ratio of fresh air to recirculated air. The HVAC system 20 may further include a low-pressure cycle switch 39 that communicates with the compressor 37. The low-pressure switch 39 may be operable to deactivate the compressor 37 under certain conditions. In addition, the compressor 37 can be deactivated when the evaporator core temperature drops below a predetermined value; this helps to prevent freezing of the evaporator core 36.

Operation of the HVAC system 20 may be controlled by an electronic controller 40. The controller 40 can generate signals to control the HVAC system 20 according to a variety of inputs. Moreover, the controller 40 may receive inputs from a number of climate control devices, such as sensors, other control modules, or the like. In addition to receiving inputs from various climate control devices, the controller 40 may also receive inputs from a vehicle occupant via an input device, which may be a control head 42 as illustrated in FIG. 2.

Figure 2:
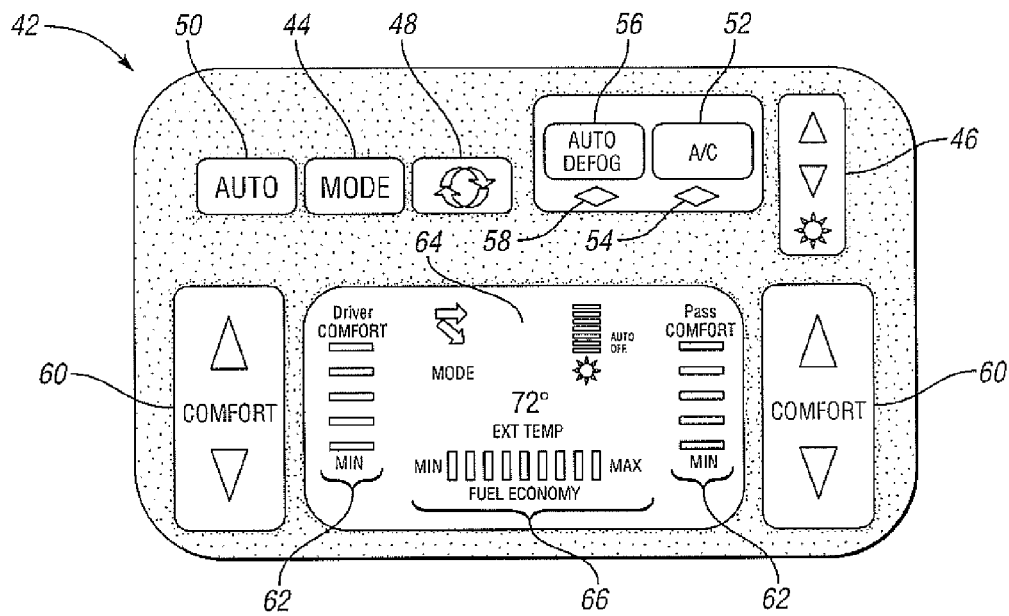
FIG. 2 is a simplified, exemplary front plan view of a climate control head in accordance with an embodiment of the present application.

FIG. 2 illustrates an exemplary climate control head 42 in greater detail. As mentioned above, the control head 42 can act as an input device for vehicle occupants commonly used in vehicle instrument panels, allowing manual selection of various climate control functions. A mode selector switch 44 allows an occupant to choose where airflow will be directed. The climate control head 42 may further include a fan selector switch 46 for providing on-off, manual and automatic fan speed control. A recirculation switch 48 allows for full recirculation of cabin air, all fresh air, or some combination thereof. An automatic mode switch 50 may be provided, which allows the climate control system 10 to regulate passenger cabin temperature as well as control various climate control functions automatically based upon environmental conditions and/or vehicle operating characteristics.

Additionally, the climate control head 42 may include an A/C switch 52 that allows an occupant to manually select air conditioning. The A/C switch 52 may include an indicator 54 that illuminates when the A/C system is being operated in either manual or the automatic mode. Moreover, an automatic defogging switch 56 may also be provided. Some automatic climate control systems monitor a temperature and humidity level of the vehicle cabin to determine if a defogging operation of the windshield is desirable. When it is determined that an automatic defogging operation is desired, the air conditioning system is typically operated to provide a supply of relatively dry air to the windshield to quickly effect the defogging operation. Like the A/C switch 52, an indicator 58 may illuminate when an automatic defogging operating is performed.

The control head 42, including the features described above, is just one example of a control head that can be used in accordance with embodiments of the present application. Other control heads, including other analog or digital control heads may also be used, and may include alternate or additional features other than the ones described herein without departing from the scope of the present application.

According to a particular embodiment of the present application, the climate control head 42 may include one or more comfort level switches 60, which can provide general comfort control of the passenger cabin 29 in both the manual and automatic modes. The comfort level switch 60 may be provided in place of an automatic temperature control switch. An occupant may select a comfort level setting rather than a specific temperature. In this regard, a range of comfort level settings, described in greater detail in FIG. 3, may be offered to provide for more efficient climate control.

The comfort level switches 60 may include a driver comfort level selector and a passenger comfort level selector for dual-zone climate control. Each comfort level switch 60 may be used by an occupant to select a desired cabin comfort level, which can be displayed by a corresponding comfort level indicator 62 using a display panel 64. The climate control system 10 may then operate to achieve and maintain the occupant set comfort level automatically. The comfort level indicators 62 may include a minimum comfort level and a maximum comfort level, as well as one or more intermediate comfort levels. The display panel 64 may further display current cabin temperature, current outside ambient temperature, fan power, airflow direction, or the like.

Additionally or alternatively, the display may include a fuel economy indicator 66 showing the impact of the comfort level setting and other climate control functions (e.g., HVAC blower and recirculation door position) on fuel economy. For an HEV that uses an electric compressor in the A/C mode, the comfort level setting, HVAC blower speed and recirculation door position dictate compressor power consumption. In the heating mode, when the electric compressor is not in operation, the fuel economy indicator 66 may show the impact of, for example, HVAC blower speed, recirculation door position and the heater core 34 on the fuel economy. Thus, the fuel economy indicator 66 may assist vehicle operators become aware of the impacts of control head setting choices on the fuel economy while operating the vehicle. This instant feedback, particularly in combination with the implementation of comfort level settings, may allow vehicle operators to obtain a balance between occupant comfort and fuel economy.

Figure 3:
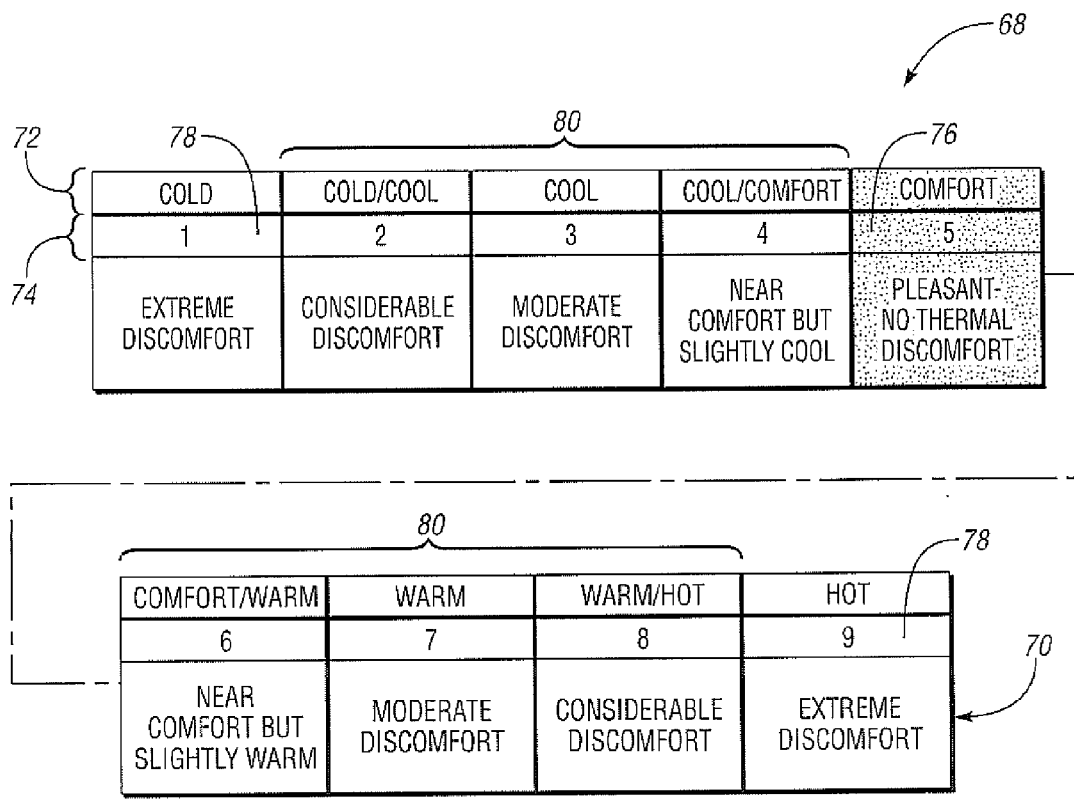
FIG. 3 is a simplified, exemplary table illustrating a climate control comfort setting scale in accordance with an embodiment of the present application.

Turning now to FIG. 3, a simplified, exemplary table 68 depicting a climate control comfort level scale 70 employed by the system 10 according to an embodiment of the present application is shown. As seen therein, a range of thermal comfort levels 72 defines a spectrum of relative thermal comfort ranging from "cold" at one end to "hot" at the other end. Each relative thermal comfort level 72 corresponds to a comfort level setting 74 shown, by way of example, as comfort level settings 1-9. It should be noted that greater or fewer comfort levels may be provided without departing from the scope of the present application.

A maximum comfort level setting 76, shown as comfort level 5, may correspond to a relatively high level of thermal comfort (i.e., no thermal discomfort). Comfort level setting 5, therefore, may be equivalent to approximately 72° F., for example. Since the climate control head provides for selection of comfort levels, rather than specific temperature values, it should be appreciated that a particular comfort level setting may correspond to a range of temperatures. As an example, comfort level 5 may correspond to temperatures ranging from 69° F. to 75° F. Particular comfort level temperature ranges may vary based upon various design requirements, preferences and/or other system parameters without departing from the scope of the present application. As shown, comfort level 5 may fall in the middle of the spectrum of thermal comfort levels. This is because it may correspond to the optimum level of thermal comfort within the range of relative thermal comfort levels 72 that incorporate both cold and hot temperature extremes.

A minimum comfort level setting 78 may likewise be provided. The minimum comfort level setting 78 may correspond to a relative low level of thermal comfort. Since thermal discomfort can occur in both warm temperatures and cool temperatures, the minimum comfort level setting 78 is shown at both ends of the comfort level scale 70 provided by table 68 of FIG. 3. For purposes of discussion, comfort level settings 1-5 may correspond to comfort levels in relatively cool ambient temperatures when, for example, the heater core 34 may be employed to warm the passenger cabin 29. Similarly, comfort level settings 5-9 may correspond to comfort level in relatively warm ambient temperatures when, for example, the A/C system 35 may be employed to cool the passenger cabin 29. However, it should be understood that the comfort level settings 74 may be similarly employed without operation of a heater or air conditioner (e.g., in moderate ambient conditions). To this end, comfort level setting 1 may correspond to a minimum comfort level defining relatively extreme discomfort in cooler environmental conditions, while comfort level setting 9 may correspond to a minimum comfort level defining relatively extreme discomfort in warmer environmental conditions.

Intermediate comfort levels may be provided having corresponding intermediate comfort level settings 80. For example, in cooler conditions, comfort level settings 2-4 may be selected. Each incremental increase in comfort level setting may correspond to an incremental increase in thermal comfort, as provided in FIG. 3. Similarly, in warmer conditions, comfort level settings 6-8 may be selected. In this instance, each incremental increase in comfort level setting may correspond to an incremental decrease in thermal comfort.

Returning to FIG. 2, a desired occupant comfort level may be selected using the comfort level switch 60. Should an occupant wish to maximize thermal comfort, the comfort level switch 60 may be manipulated accordingly until the comfort level indicator 62 reaches the maximum setting corresponding to comfort level setting 5. On the other hand, should an occupant wish to sacrifice additional comfort to improve fuel economy, the comfort level switch 60 may be manipulated accordingly with the comfort level indicator 62 providing a corresponding indication of the current selected comfort level. Reduction in the thermal comfort level corresponds to a shift within the comfort level scale 70 of FIG. 3 away from comfort level setting 5. As described above, the shift may occur in either direction depending on the ambient environmental conditions and/or whether the climate control system is operating in a heating mode or an air conditioning mode.

Although comfort levels 1 and 9 have been described as the minimum comfort levels, it should be noted that alternate comfort level settings might represent the minimum comfort levels without departing from the scope of the present application. For example, at one end of the spectrum, a comfort level 3 on the comfort level scale 70 may be provided as the minimum comfort level setting 78. Thus, in cooler ambient temperatures, selection of the minimum comfort level setting 78 may allow for relatively moderate passenger discomfort (i.e., cool). Likewise, a comfort level 7 on the comfort level scale 70 may be provided as the minimum comfort level setting 78 at the other end of the spectrum. In warmer ambient temperatures, selection of the minimum comfort level setting 78 may also allow for relatively moderate passenger discomfort (i.e., warm). Resolution of the comfort level indicator 62 may be adjusted as necessary to correspond with the comfort level scale 70.

As articulated above, the comfort level settings 74 generally correspond to relative thermal comfort inside the passenger cabin 29. Thus, it should be appreciated that although the minimum comfort level settings are described in terms of discomfort, some level of general comfort may be maintained even at the ends of the comfort level scale 70. Moreover, even though some level of general comfort may be maintained, the comfort level settings 74 may not be numbered as with conventional automatic temperature control. Accordingly, there is no implication from the control head 42 that the climate control system 10 automatically maintains a specific temperature. By providing comfort level settings instead, fuel economy performance may be increased without competing with inefficient automatic temperature control.

To this end, each comfort level setting 74 may correspond to a range of temperatures as previously mentioned. Thus, after the passenger cabin temperature reaches the corresponding comfort range, various climate control system devices (such as the HVAC blower 30, electric compressor 37, heater core 34, or the like) may be less inclined consume additional energy. For example, when the air conditioning system 35 is operating, the system 10 may be reluctant to increase the compressor speed in order to regain comfort, which can assist in improving or maintaining fuel economy.

Figure 4A:
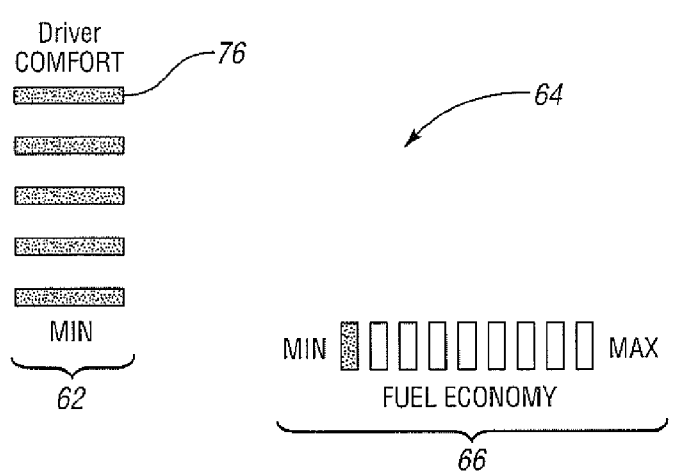
FIG. 4a is a simplified, exemplary relational diagram illustrating the impact of a comfort level setting on fuel economy in accordance with an embodiment of the present application.
Figure 4B:
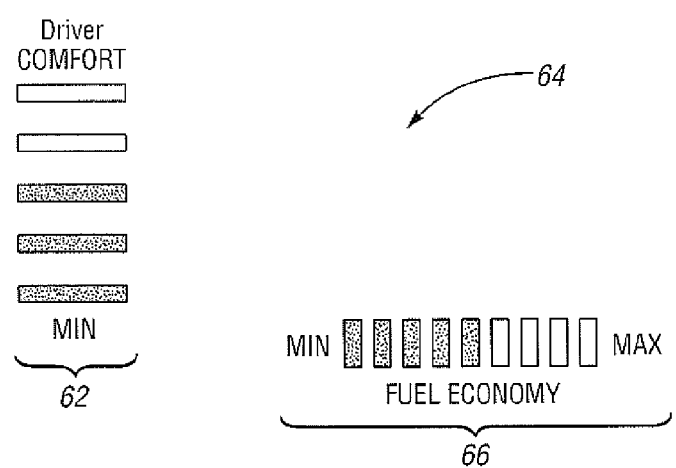
FIG. 4b is another simplified, exemplary relational diagram illustrating the impact of a comfort level setting on fuel economy in accordance with an embodiment of the present application.
Figure 4C:
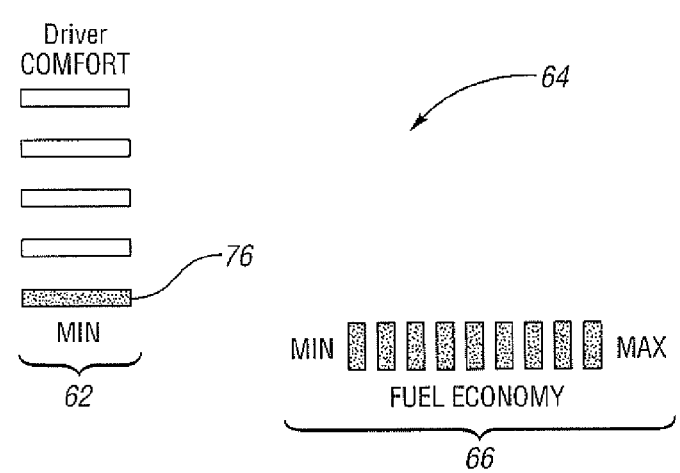
FIG. 4c is yet another simplified, exemplary relational diagram illustrating the impact of a comfort level setting on fuel economy in accordance with an embodiment of the present application.

In this regard, FIGS. 4*a*-4*c* depict exemplary relationships between comfort level settings 74 and fuel economy. As seen therein, various comfort level settings have different impacts on fuel economy. These impacts may be communicated to an occupant through a combination of the comfort level indicator 62 and the fuel economy indicator 66. For example, FIG. 4*a* shows the comfort level indicator 62 at the maximum comfort level setting 76, while the fuel economy indicator 66 displays a minimum fuel economy reading. As an occupant turns down the comfort level setting 74, the fuel economy indicator 66 may begin to indicate an increase in fuel economy (e.g., by moving to the right), as is shown in FIG. 4*b*. Should an occupant desire to maximize fuel economy, the minimal comfort level setting 78 may be selected. Accordingly, FIG. 4*c* shows that the fuel economy indicator 66 may be at its maximum when the comfort level indicator 62 is at its minimum. Therefore, the fuel economy indicator 66 can provide a vehicle operator with a direct indication of the impact of comfort level choice on fuel economy consumptions.

While the best mode for carrying out the invention has been described in detail, those familiar with the art to which this invention relates will recognize various alternative designs and embodiments for practicing the invention as defined by the following claims.

What is claimed:

1. A climate control system comprising:
   a climate control interface including at least one thermal comfort selector and a fuel economy impact indicator; and
   a controller electrically coupled to the climate control interface and configured to:
   receive input from the thermal comfort selector corresponding to a thermal comfort selector setting, and
   transmit an output to the climate control interface to adjust the fuel economy impact indicator instantly based upon the thermal comfort selector setting prior to adjustment of the climate control system;
   wherein the climate control interface displays a decrease in fuel economy using the fuel economy impact indicator when the input is indicative of an increase in a current thermal comfort selector setting in both an air conditioning mode and a heating mode and the climate control interface displays an increase in fuel economy using the fuel economy impact indicator when the input is indicative of a decrease in the current thermal comfort selector setting in both the air conditioning mode and the heating mode.

2. The system of claim 1, wherein the climate control interface further includes at least one thermal comfort indicator associated with the at least one thermal comfort selector for displaying the thermal comfort selector setting.

3. The system of claim 1, wherein the controller is further configured to:
   receive input indicative of a heating, venting and air conditioning (HVAC) blower speed and a recirculation door position; and
   calculate the impact on fuel economy of the thermal comfort selector setting based at least in part upon the HVAC blower speed and the recirculation door position.

4. The system of claim 1, wherein a decrease in the thermal comfort selector setting corresponds to an increase in passenger cabin temperature when the climate control system is operating in the air conditioning mode.

5. The system of claim 4, wherein a decrease in the thermal comfort selector setting corresponds to a decrease in the passenger cabin temperature when the climate control system is operating in the heating mode.

6. The system of claim 1, wherein the climate control interface is calibrated so that it displays the fuel economy impact indicator in a minimum fuel economy state when the input is indicative of a maximum thermal comfort selector setting.

7. The system of claim 1, wherein the climate control interface is calibrated so that it displays the fuel economy impact indicator in a maximum fuel economy state when the input is indicative of a minimum thermal comfort selector setting.

8. A method for operating a climate control system, the method comprising:
- receiving input from a thermal comfort selector corresponding to a thermal comfort selector setting;
- displaying a thermal comfort indicator corresponding to the thermal comfort selector setting; and
- displaying a change in a fuel economy impact indicator instantly based upon the thermal comfort selector setting prior to adjustment of the climate control system;
- wherein the fuel economy impact indicator indicates a decrease in fuel economy when the input is indicative of an increase in a current thermal comfort selector setting in both an air conditioning mode and a heating mode and the fuel economy impact indicator indicates an increase in fuel economy when the input is indicative of a decrease in the current thermal comfort selector setting in both an air conditioning mode and a heating mode.

9. The method of claim 8, further comprising:
- receiving input indicative of a heating, venting and air conditioning (HVAC) blower speed and a recirculation door position; and
- calculating the impact on fuel economy of the thermal comfort selector setting based at least in part upon the HVAC blower speed and the recirculation door position.

10. The method of claim 9, wherein the impact on fuel economy relates to power consumption of an electric compressor, the power consumption based at least in part upon the thermal comfort selector setting, the HVAC blower speed and the recirculation door position.

11. The method of claim 8, wherein the climate control system is configured to operate in the air conditioning mode such that a decrease in the thermal comfort selector setting corresponds to an increase in passenger cabin temperature.

12. The method of claim 11, wherein the climate control system is configured to operate in the heating mode such that a decrease in the thermal comfort selector setting corresponds to a decrease in the passenger cabin temperature.

13. A climate control head unit comprising:
- at least one thermal comfort selector configured to receive input indicative of a thermal comfort change request;
- at least one thermal comfort indicator, associated with the thermal comfort selector configured to indicate a current thermal comfort selector setting based upon the thermal comfort change request; and
- a fuel economy impact indicator configured to display the impact on fuel economy of the thermal comfort change request instantly based at least in part upon the current thermal comfort selector setting prior to adjustment of the climate control system;
- wherein the fuel economy impact indicator indicates a decrease in fuel economy when the input is indicative of a request to increase the current thermal comfort selector setting in both an air conditioning mode and a heating mode and the fuel economy impact indicator indicates an increase in fuel economy when the input is indicative of a request to decrease the current thermal comfort selector setting in both the air conditioning mode and the heating mode.

14. The climate control head unit of claim 13, wherein a decrease in the current thermal comfort selector setting corresponds to an increase in passenger cabin temperature when operating in the air conditioning mode.

15. The climate control head unit of claim 14, wherein a decrease in the current thermal comfort selector setting corresponds to a decrease in the passenger cabin temperature when operating in the heating mode.

* * * * *